United States Patent [19]

Harvey

[11] Patent Number: 5,335,561
[45] Date of Patent: Aug. 9, 1994

[54] IMPULSE CONVERTER

[76] Inventor: James Harvey, 6040 Edsall Rd., Apt. 103, Alexandria, Va. 22304

[21] Appl. No.: 965,761
[22] Filed: Oct. 23, 1992
[51] Int. Cl.⁵ ............................................. F16H 33/20
[52] U.S. Cl. ..................... 74/84 R; 74/61; 74/89.15
[58] Field of Search ............... 74/84 R, 845, 89.15, 74/61; 244/62, 172

[56] References Cited

U.S. PATENT DOCUMENTS

| | | | |
|---|---|---|---|
| 1,953,964 | 4/1934 | Laskowitz | 74/84 R |
| 3,584,515 | 6/1971 | Matyas | 74/84 R |
| 3,750,484 | 8/1973 | Benjamin | 74/84 S |
| 3,756,086 | 9/1973 | McAlister et al. | 74/84 R |
| 3,810,394 | 5/1974 | Novak | 74/87 |
| 3,979,961 | 9/1976 | Schnur | 74/61 |
| 4,261,212 | 4/1981 | Melnick | 74/84 R |
| 4,712,439 | 12/1987 | North | 74/84 R |
| 4,770,063 | 9/1988 | Mundo | 74/84 S |
| 5,054,331 | 10/1991 | Rodgers | 74/84 R |

FOREIGN PATENT DOCUMENTS

| | | | |
|---|---|---|---|
| 2610646 | 9/1977 | Fed. Rep. of Germany | 74/84 S |
| 2926583 | 1/1981 | Fed. Rep. of Germany | 244/172 |
| 3100032 | 7/1982 | Fed. Rep. of Germany | 244/172 |
| 3742904 | 6/1989 | Fed. Rep. of Germany | 244/62 |
| 1340196 | 9/1963 | France | . |
| 2444172 | 8/1980 | France | 74/84 S |
| 580085 | 7/1958 | Italy | 244/172 |
| 60-56182 | 4/1985 | Japan | 74/84 S |
| 1412146 | 10/1975 | United Kingdom | 74/84 R |
| 1547762 | 6/1979 | United Kingdom | 74/84 S |
| WO8605852 | 10/1986 | World Int. Prop. O. | 74/84 S |

OTHER PUBLICATIONS

Advanced Engineering Mathematics, Erwin Kreyszig, 1962, p. 298, Ex. 3 and FIG. 162, Library of Congress Cat. #62-15182.
Design News, Feb. 18, 1985, pp. 154-155 "Propulsion System Harnesses Centrifugal Force", by Jack Gilbert and Steve Whitters.

Primary Examiner—Allan D. Herrmann
Attorney, Agent, or Firm—C. C. Shroff

[57] ABSTRACT

An impulse converter is provided for converting angular impulses into linear impulses. The impulse converter includes a frame with frame members adapted to be oppositely rotated on the frame. The frame members may be rotated by any rotation generating device. Arms and masses are provided on the frame members, the masses are to be accelerated both radially and tangentially by the arms due to the rotation of the frame members. A rack and pinion mass retrieval unit is provided on each of the arms to throw out and/or retrieve the masses back along the length of the arm. The masses are re-accelerated along the arms, and re-retrieved by the rack and pinion mass retrieval unit which converts the radial and tangential accelerations into linear impulses.

8 Claims, 5 Drawing Sheets

IMPULSE CONVERTER

BACKGROUND OF THE INVENTION

1. Field of the Invention

The present invention relates generally to unidirectional force machines, and more particularly, to an impulse converter especially adapted to effect a conversion of angular impulses into linear impulses.

2. Description of the Prior Art

Impulse converters in the form of contra-rotating and unbalanced massed frames are known in the art of unidirectional force generation.

Thus, while the foregoing body of prior art indicates it to be well known to use unbalanced masses radially accelerated by arms on rotating frames to generate unidirectional force, the provision of a more simple and effective device is not contemplated. Nor does the prior art described above teach or suggest an impulse converting device which may be used by individuals needing greater conversion efficiencies and magnitudes of impulse output. The foregoing disadvantages are overcome by the unique mass passage and structure of the present invention as will be made apparent from the following description thereof. Other advantages of the present invention over the prior art also will be rendered evident.

SUMMARY OF THE INVENTION

To achieve the foregoing and other advantages, the present invention, briefly described, provides an impulse converter for converting angular impulses into linear impulses. The impulse converter includes a frame with frame members adapted to be oppositely rotated on the frame. The frame members may be rotated by any rotation generating device. Arms and masses are provided on the frame members, the masses are to be accelerated both radially and tangentially by the arms due to the rotation of the frame members. A rack and pinion mass retrieval unit is provided on each of the arms to retrieve the masses back along the length of the arm. The masses are re-accelerated along the arms, and re-retrieved by the rack and pinion mass retrieval unit which converts the radial and tangential accelerations into linear impulses.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least three of preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved impulse converter which has all of the advantages of the prior art and none of the disadvantages.

It is another object of the present invention to provide a new an improved impulse converter which may be easily and efficiently manufactured and marketed.

It is a further objective of the present invention to provide a new and improved impulse converter which is of durable and reliable construction.

An even further object of the present invention is to provide a new and improved impulse converter which is susceptible of a low cost of manufacture with regard to both materials and labor, and which accordingly is then susceptible of low prices of sale to the consuming public, thereby making such an impulse converter available to the buying public.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated, preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new and improved impulse converter embodying the principles and concepts of the present invention will be described.

Figure 1:
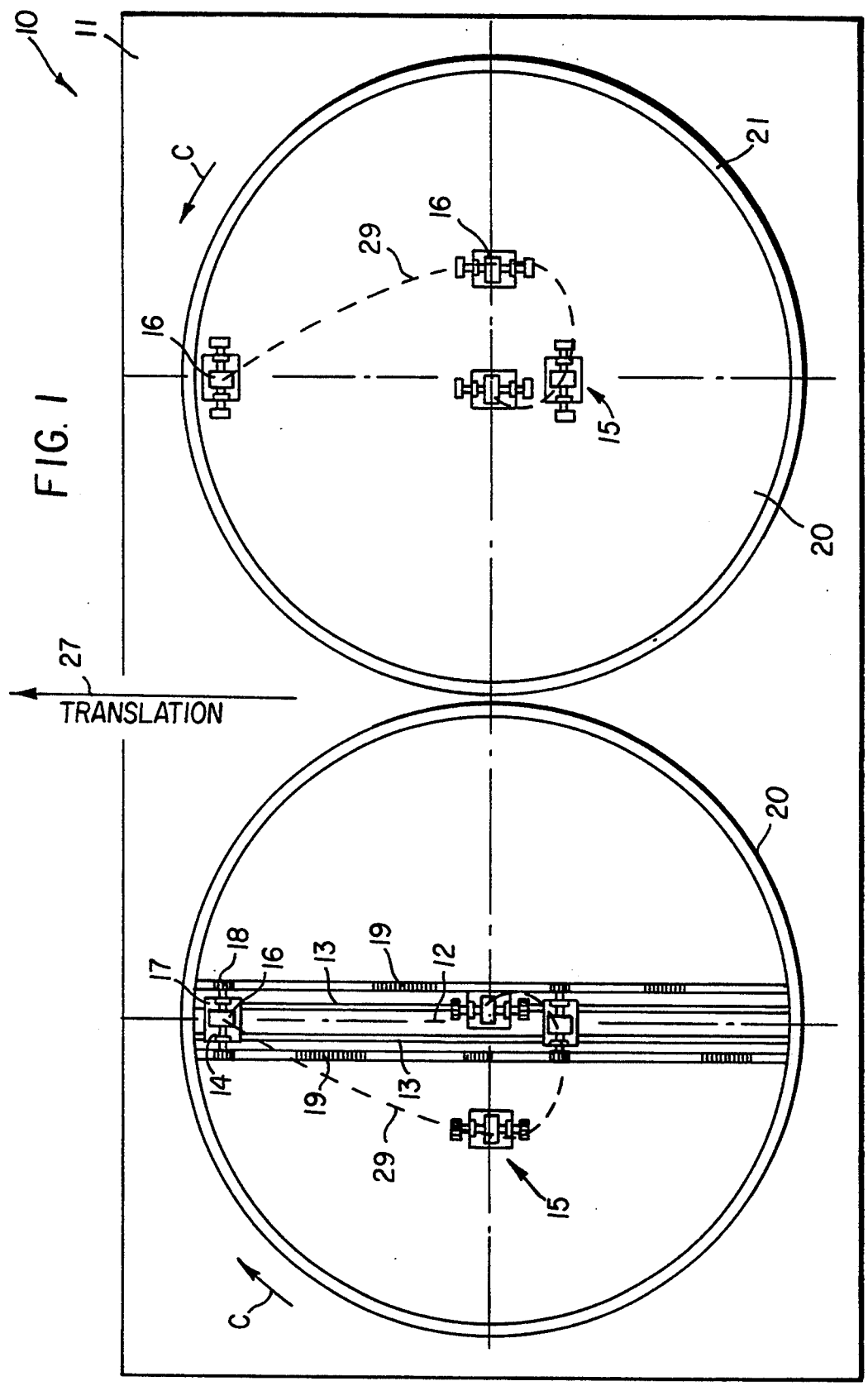
FIG. 1 is a top view showing the impulse converter and the paths followed by the motors.
Figure 2:
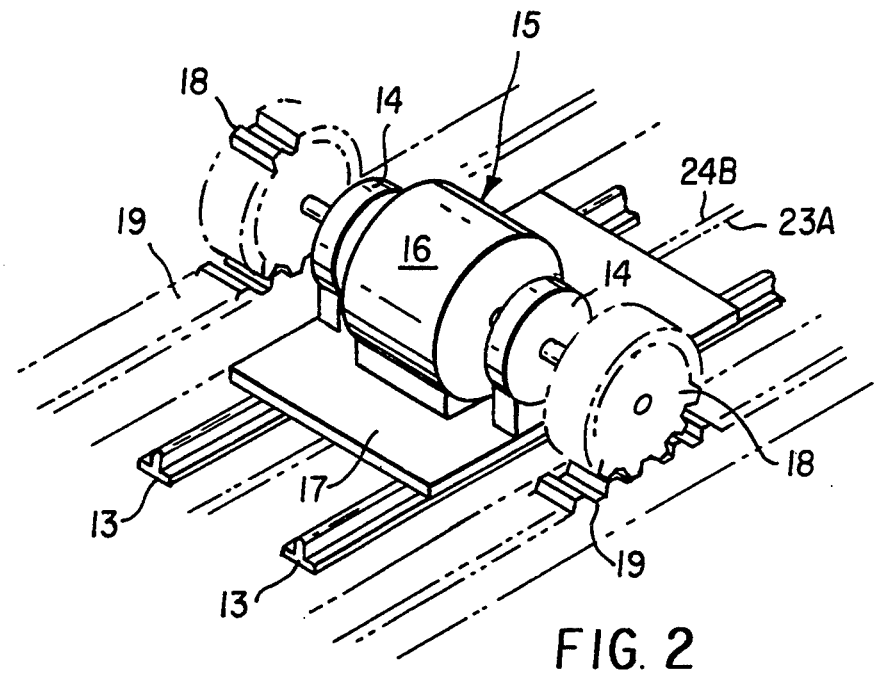
FIG. 2 is a close up view showing the motor mounted on a rack and pinion and a magnetic clutch.
Figure 3:
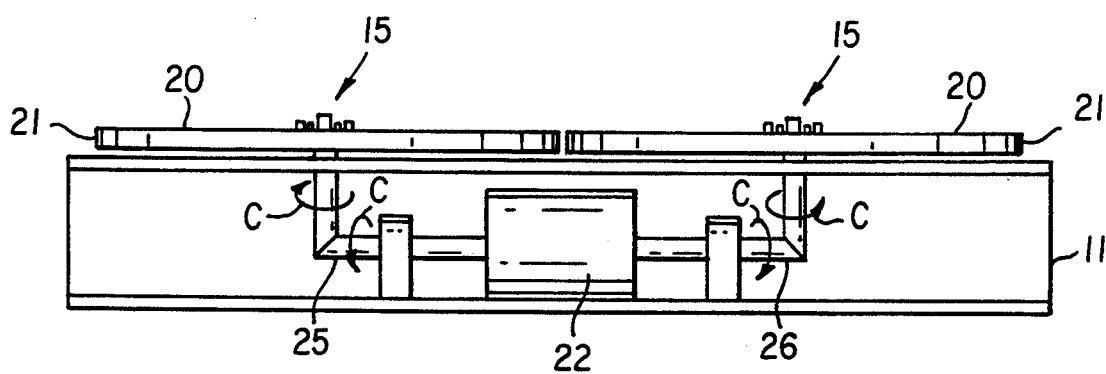
FIG. 3 is a side view of the impulse converter.

Turning initially to FIGS. 1-3 there is shown a first exemplary embodiment of the impulse converter generally designated by reference numeral 10. Impulse converter 10, shown in FIG. 1, generates a propelling force in the direction indicated by arrow 37. Generally, impulse converter 10 includes a frame 11, constant running motor mass assembly 15, and controlling apparatus 12 (FIG. 4) or controlling the movement of constant running motor mass assembly 15.

Frame 11 is adapted to be secured to a vehicle which is to be imparted motion through propulsion. Frame 11 includes two oppositely rotating frame members 20 having thrust bearings 21 encircling each rotating frame member 20 on frame 11. Each rotating frame member 20 with thrust bearings 21 are mounted at their centers to drive shaft 25 (FIG. 3) for rotation by primary power source motor 22.

Each constant running motor mass assembly 15 includes a motor platform 17 upon which is mounted a constant running motor 16 with pinions 18. The pinions 18 are coupled to the constant running motor 16 by magnetic particle clutches 14. Pinions 18 are linked by gear teeth to racks 19 (FIGS. 2 and 4) which are mounted on rotating frame member 20 in abscissa and ordinate fashion.

Constant running motor mass assemblies 15 are disposed on the surface of rotatable frame member 20. Constant running motor mass assemblies 15 experience an acceleration in the radial direction with respect to the rotatable frame member 20, when the rotatable frame member 20 is rotated by the primary power source motor 22. Arrow C represents the direction of rotation of a rotatable element, e.g. frame member 20, shaft 25 and shaft 26 etc. Constant running motor mass assemblies 15 are simultaneously given increasing tangential velocity relative to the frame 11 by their position on rotating frame member 20.

Not shown are the reducing motors within primary power source motor 22 for controlling angular velocities and angular accelerations of the drive shaft 25.

Control apparatus 12 includes linear motion bearings 13 secured to the top surface of the rotatable frame member 20. Linear motion bearings 13 mounted on the underside of motor platform 17 guide constant running motor mass assemblies 15 for mating travel of pinions 18 on racks 19 mounted on the rotatable frame member 20. Magnetic particle clutches 14 are coupled between the shafts of constant running motor 16 and pinions 18 as a coupling means for engaging and disengaging pinions 18 to the shafts of the constant running motor 16.

Figure 4:
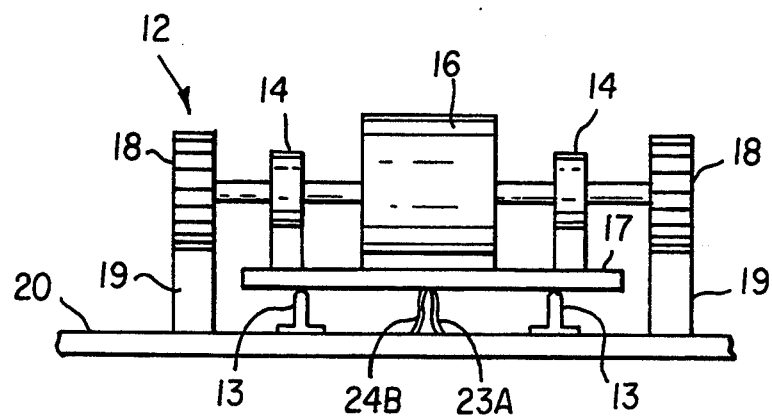
FIG. 4 is a front view of the motor and the rack and pinion assembly.
Figure 5A:
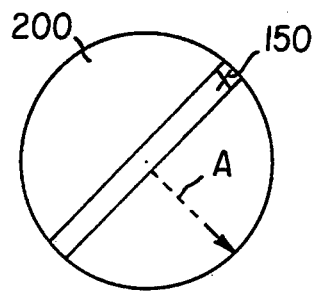
FIGS. 5a through 5d show a diagram of the reversing direction change possible of the coriolis accelerations as the motor mass passes through the center of rotation of the rotatable members on the impulse converter.
Figure 5B:
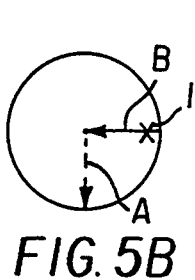
Figure 5C:
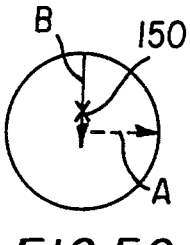
Figure 5D:
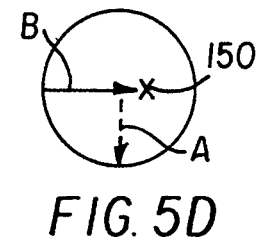
Figure 6A:
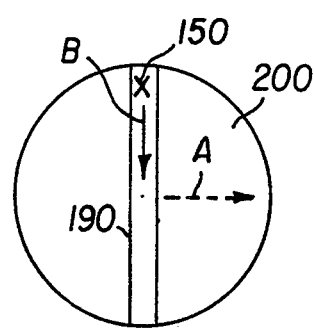
FIG. 6A represents the motor travelling diametrically on the rotating frame members capable of passing through the center of rotation of the rotatable members.
Figure 6B:
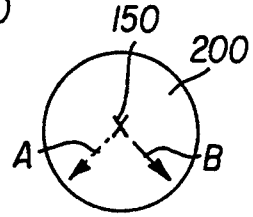
FIG. 6B represents the motor travelling on the rotating frame at a discrete time interval passing through the center of rotation.
Figure 6C:
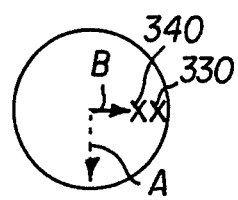
FIG. 6C represents the two motor mass embodiment of the invention, the constant running motors travelling in either diametrical direction on the rotating frame.
Figure 6D:
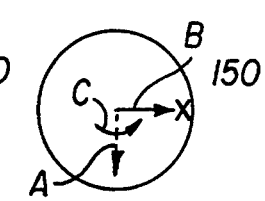
FIGS. 6D through 6I inclusive diagrams the changing radial motor mass position as the frame member rotates with respect to the coriolis accelerations developed on the frame.
Figure 6E:
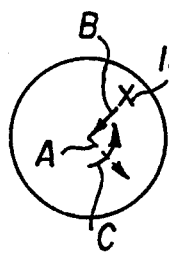
Figure 6F:
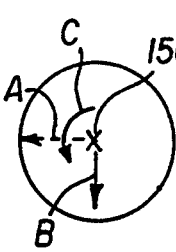
Figure 6G:
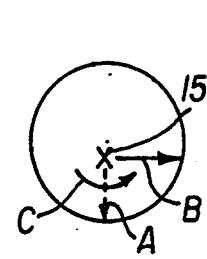
Figure 6H:
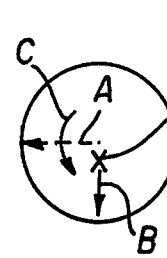
Figure 6I:
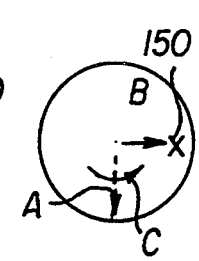

Electrical contacts 23A and 24B serve to energize magnetic particle clutch 14 and constant running motor 16 respectively as seen in FIG. 4.

The impulse converter 10 operates as follows. Primary motor 22 rotates frame members 20, as frame members 20 is rotated, each constant running motor mass assembly 15 is rotated in a rigid and radially free manner to follow a predetermined asymmetrical spiral path 29 as rotatable frame member 20 rotates.

As each constant running motor mass assembly 15 reaches a predetermined point on the spiral path 29 contact is made on the electrical contact 23A which energizes magnetic particle clutch 14 to engage pinion 18 to the shafts of the constant running motor 16 to complete the asymmetrical spiral path 29 to generate an impulse output and radial displacement, the constant running motor mass assemblies 15 to return upon the frame member 20 and in turn onto thrust bearing 21 and then to frame 11.

A propelling force having a direction indicated by arrow 27 is generated from the time the constant running motor mass assembly 15 goes into the radial return path 30 until the constant running motor mass assembly 15 is radially freed by the de-energizing of the magnetic particle clutches 14 through electrical contacts 23A to begin the cycle all over again. Through the repetition of this cycle conversion of rotational energy as angular impulses into linear impulses in a desired direction as a uni-directional force is achieved.

Referring now to the FIGS. 6A through 6I, when two oppositely rotating constant running motors 330 and 340 pass through the center of rotation with mass 150 of the constant running motors 330 and 340 being on opposite sides of the center, coriolis acceleration will be eliminated by the action of a shifting couple, i.e. conservation of angular momentum acting as a balanced couple. There will be little or no generation of coriolis acceleration occurring when this kind of torque is applied in a coupled manner outside the center of rotation. FIGS. 6A through 6I show the instantaneous emergence of motor mass assembly 15 from the dead center of rotation when the coriolis acceleration changes 180 degrees. This action is used in radial spiral throws, strategic torquing, amplified coriolis accelerations and over developed coriolis accelerations and is shown by the elements A, B, and C of FIGS. 6A through 6I and in B of FIGS. 7A through 7E.

Figure 7A:
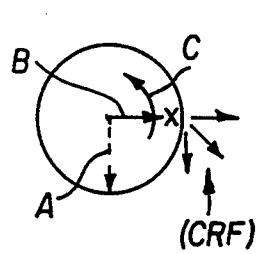
FIGS. 7A through 7E diagrams the accelerations in the over developed coriolis embodiment of the instant invention with a two motor mass passing through the center of rotation.
Figure 7B:
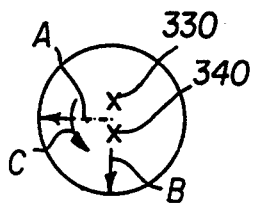
Figure 7C:
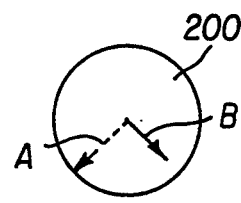
Figure 7D:
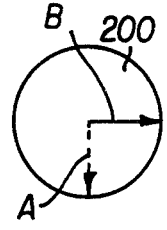
Figure 7E:
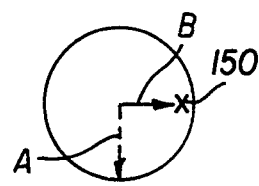

The arrows A in FIGS. 5a through 5d and 6A through 6I represents coriolis accelerations. Arrows B represent radial and diametrical travel of the motor mass 150. Arrows C represents the rotational direction of the rotatable member 200. A coriolis acceleration embodiment uses an overdeveloped coriolis acceleration to propel the impulse converter as shown in FIGS. 5a through 5d. Each rotatable frame member has a single diametrical rack which extends from edge to edge on the rotatable frame member 200. Motor mass assembly 150 is free to pass from edge to edge through the center of rotation of frame member 200. The cross arrows C, ie, those arrows crossing arrow A (indicating coriolis acceleration), show the rotation direction of the frame member 200 as shown in FIGS. 6D through FIG. 6I. Over developed coriolis acceleration has the added acceleration of the motor mass 150 whereas the amplified coriolis acceleration uses the precessional forces which are gyroscopically added as accelerations. FIGS. 5a through 5d shows the over-developed coriolis acceleration embodiment with the mass assembly passing near or through the center of rotation in the last half of the first quadrant, the second quadrant, the third quadrant and the first half of the fourth quadrant. The over-developed coriolis accelerations are over-developed by the additive throw-out and return accelerations given to the motor mass assembly 150 in the second half of the fourth quadrant and the first half of the first quadrant. Either of the two constant running motors 330 or 340 may be engaged for this motion depending on the direction of radial travel desired, i.e., depending on the direction of the radial throw-out or return relative to the platform. A Complementary Resultant Force, (CRF) as shown in FIG. 7A, of propulsion can be generated between the radial return of mass assembly 150 and the coriolis acceleration generated up to and through that return. The magnetic clutches 140 (not shown) strategically engage pinions 180 and motor 160 only in the second half of the fourth quadrant and the first half of the first quadrant to maximize the resultant force between the radially returned mass assembly 150 and the over developed coriolis force as a unidirectional force.

Figure 8:
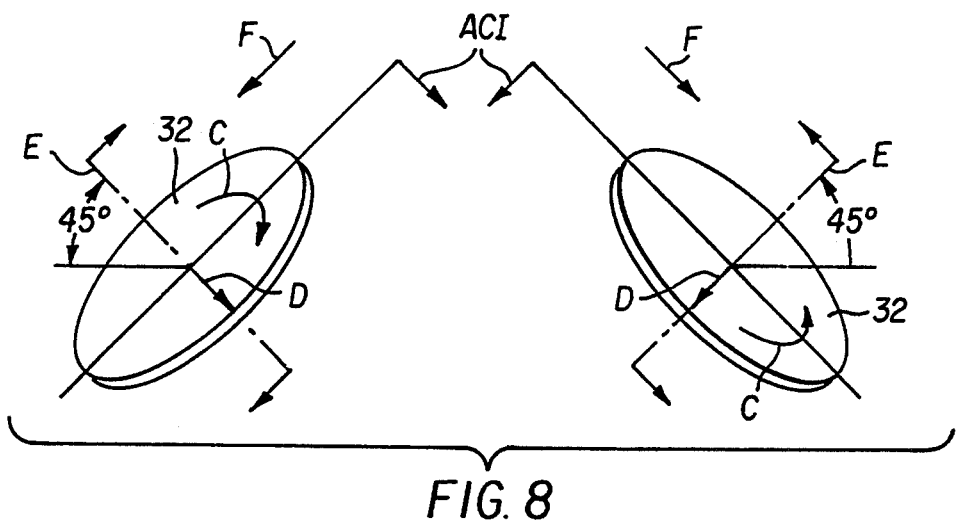
FIG. 8 shows the two gyromass embodiment and the accelerations developed thereon.

Referring now to FIG. 8 gyromass 32 can be placed on the motor mass assembly with its precession direction set at 45 degrees to both the plane of the rotating member and to the radial direction of the rack on the rotating member 140 (not shown). This facing of the precession direction will amplify the resulting coriolis acceleration by the amount of precessional force generated from the gyroscopic inertia available. The rotational directions and critical angle settings of the optimum precession facing the gyromass are shown in FIG. 8 by arrow C indicating rotation and arrow D indicating precessional direction respectively. The torque on the gyromass 32 generated by the angular velocity of the rotating member is represented by E and F showing the direction of the radial acceleration on the gyromass 32.

If two contra-rotating mass systems are used in the over-developed coriolis acceleration embodiment, then the radial return force will be canceled since the radial return force would be diametrically opposed to each other. Furthermore, when the over-developed coriolis acceleration embodiment is being used, two oppositely rotating constant running motors are needed on the same motor platform as explained above. However, only a single rotating mass system can be used to recoup both the amplified radial return force and the over-developed coriolis acceleration as shown in FIG. 9.

An amplified coriolis acceleration embodiment uses the precession from oriented gyromasses to amplify the propulsion generated from the coriolis accelerations. This amplification can be used with or without over-developed coriolis accelerations. Even though the radial return will also be canceled when overdeveloped coriolis acceleration is employed in the two contra-rotating mass systems and the radial return will be canceled, the efficiency of the system will still be increased by the amount of the over-developed increase in coriolis acceleration.

Figure 9:
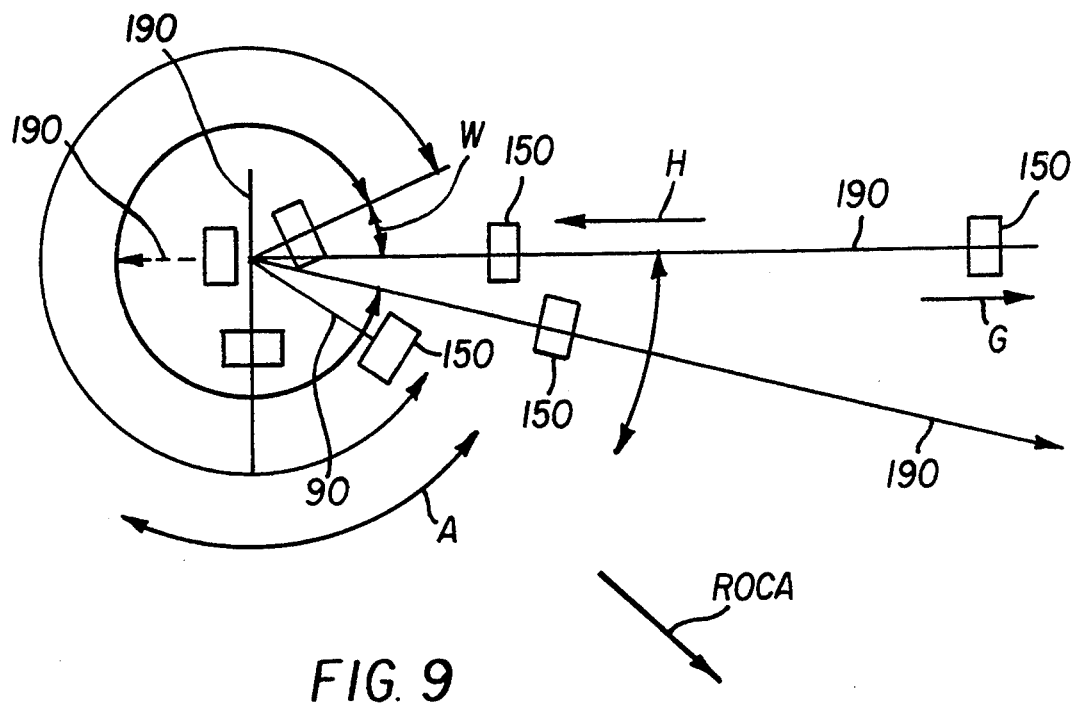
FIG. 9 show the resultant unidirectional force generated in the over developed coriolis acceleration embodiment.

FIG. 9 shows that only one rotating frame can be used to combine coriolis acceleration A and amplified radial throw-out G and rapid radial return H in complement to form a resultant over-developed coriolis acceleration ROCA as a linear impulse. W represents the window for H to generate and express resultant over developed coriolis acceleration.

Two oppositely rotating and framed impulse converters can be loaded with gyroscopic masses 32. The plane of rotation of each of the gyroscopic masses 32 contains the precessional force direction. These planes are set at an angle of 45 degrees to the plan of the impulse converter's rotation as shown in FIG. 8. The rotation plane of these gyroscopes will therefore also be at a 45 degree angle to the radial plane of the impulse converter. The coriolis acceleration will be amplified by the gyroscopic precession force generated by the framed gyroscopic masses as the torque from the impulse converter's rotation is applied to the framed gyroscopes, thus producing precessional force.

In the amplified coriolis impulse converter (ACI) embodiment both the extension and retrieval directions of the gyroscopic mass are always perpendicular to both the developed impulse for translation and the net precessional force generated at any instant on a point location in the rotation of the impulse converter.

Figure 10A:
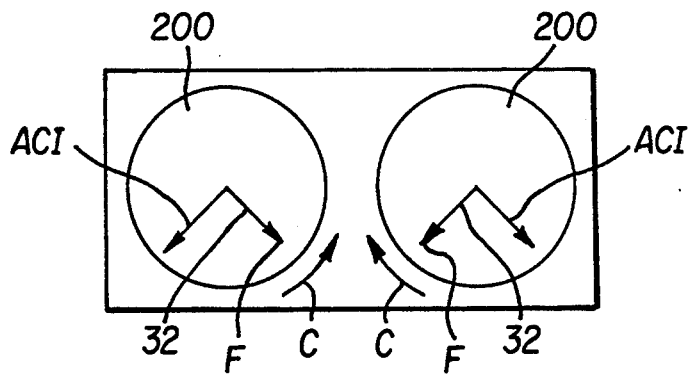
FIGS. 10a and 10b diagrams two amplified coriolis impulse embodiments generated from two oppositely rotating frame members.
Figure 10B:
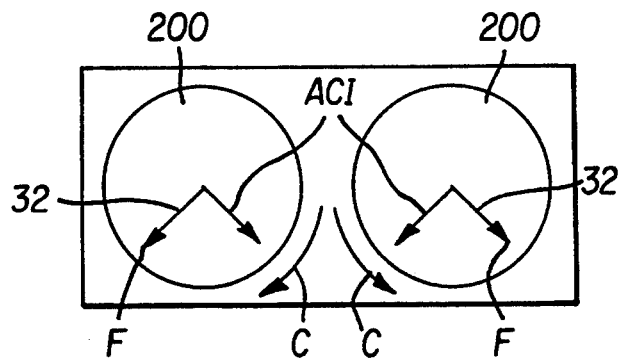

FIG. 10a and 10b depict the two possible directions for rotations of the frame members to oppositely rotate and generate coriolis impulse A from the precessional force. The gyroscopic mass 32 has a radial travel direction F and an amplified coriolis acceleration (ACI). The directions of the precessional force will be developed at 45 degrees to both the rotational plane of the rotational member 200 and the radial travel plane F.

The vector products for angular momentum, torque, and the angular velocity of precession are to be included in calculating the linear impulse generated with respect to time and a single direction from the coriolis impulse. The impulses generated from the gyroscopic vector product and the coriolis acceleration A are justifiable called amplified coriolis impulses (ACI).

The efficiencies of the various impulse converter embodiments can be dramatically increased by using two counter rotating continuously running motors for developing over developed radial accelerations. The increase in efficiencies will be proportional to the quantity of impulses delivered. Furthermore the oriented gyromass will improve coriolis accelerations used in the amplified coriolis accelerations by the amount of available precession.

Improvements in the efficiencies is limited only by the angular velocities achieved, the size of the throw masses and the strengths of materials employed.

It is apparent from the above that the present invention accomplishes all of the objectives set forth by providing a new and improved impulse converter which converts angular impulses into linear impulses in an efficient and simple manner.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

I claim:

1. An impulse converter for converting angular impulses into linear impulses comprising:
   a frame;
   frame members on said frame adapted to be oppositely rotated on said frame;
   means to rotate said frame members;
   radial arms in communication with said frame members;
   masses in communication with said radial arms to be radially and tangentially accelerated by said radial arms on said rotating frame members;
   retrieval means to return said masses back along said arms;
   said retrieval means includes a rack and a pinion with a constant running motor having a magnetic clutch thereon;
   whereby the radial and tangential acceleration of the masses is converted into linear impulses.

2. The impulse converter of claim 1 wherein said masses are elongated to extend on both sides of the center of rotation.

3. The impulses converter of claim 2 wherein said masses pass through the center of rotation of said rotating frame members.

4. The impulse converter of claim 3 wherein said mass is a gyroscoping mass.

5. The impulse converter of claim 4 wherein said radial arms form a single diametric arm passing through the center of rotation of said rotating frame, said diametric arm being located on said rotating frame.

6. The impulse converter of claim 5 including linear motion bearings, said linear motion bearings incorporated to stabilize and maintain said masses on said rack.

7. The impulse converter of claim 6 wherein said gyroscoping mass is set at an angle, said angle maximizes precession relative to the developed coriolis acceleration.

8. The impulse converter of claim 7 wherein said radial arms includes three or more radial arms.

* * * * *